(12) United States Patent
Peng et al.

(10) Patent No.: US 11,524,331 B2
(45) Date of Patent: Dec. 13, 2022

(54) UNIDIRECTIONAL OR BIDIRECTIONAL SAND DISPENSING DEVICE

(71) Applicant: Kocel Intelligent Machinery Limited, Yinchuan (CN)

(72) Inventors: Fan Peng, Yinchuan (CN); Bao Yang, Yinchuan (CN); Jiejun He, Yinchuan (CN); Yunlong Xu, Yinchuan (CN); Yantao Wang, Yinchuan (CN)

( * ) Notice: Subject to any disclaimer, the term of this patent is extended or adjusted under 35 U.S.C. 154(b) by 436 days.

(21) Appl. No.: 16/617,517

(22) PCT Filed: May 24, 2019

(86) PCT No.: PCT/CN2019/088411
§ 371 (c)(1),
(2) Date: Nov. 27, 2019

(87) PCT Pub. No.: WO2020/019853
PCT Pub. Date: Jan. 30, 2020

(65) Prior Publication Data
US 2021/0362215 A1  Nov. 25, 2021

(30) Foreign Application Priority Data

Jul. 23, 2018  (CN) .......................... 201810812221.7

(51) Int. Cl.
*B22C 9/02* (2006.01)
*B33Y 30/00* (2015.01)
(Continued)

(52) U.S. Cl.
CPC ................ *B22C 5/14* (2013.01); *B33Y 30/00* (2014.12); *B33Y 80/00* (2014.12); *B22C 9/02* (2013.01)

(58) Field of Classification Search
CPC .................................. B22C 9/02; B33Y 30/00
See application file for complete search history.

(56) References Cited

U.S. PATENT DOCUMENTS 10,434,710 B2 * 10/2019 Todorov ................... B22C 9/02
2009/0072450 A1   3/2009 Wallgren et al.
(Continued)

FOREIGN PATENT DOCUMENTS

CN      105665632 A    6/2016
CN      106040976 A   10/2016
(Continued)

OTHER PUBLICATIONS

EPO machine translation of WO 2017/177603 A1 (Year: 2017).*
(Continued)

*Primary Examiner* — Kevin E Yoon
(74) *Attorney, Agent, or Firm* — Patshegen IP; Moshe Pinchas (57) ABSTRACT

A unidirectional or bidirectional sand dispensing device, including a discharge port (10), the discharge port includes a lower plate (11) and an upper plate (12), the upper plate is provided above the lower plate, an included angle between a horizontal plane and a straight line where an endpoint of a free end of the upper plate and an endpoint of a free end of the lower plate are located is a leakage angle (13), that is to say, a particulate material forms an inclined plane between the upper plate and the lower plate, and an included angle between the inclined plane and the horizontal plane is the leakage angle, which can be adjusted by changing relative positions of the upper plate and the lower plate. The direction of an opening of the sand passing passage is opposite to a moving direction during the sand dispensing operation. When the sand dispensing operation is stopped, the leakage angle is less than or equal to the static repose angle of the particulate material, and is greater than or equal to zero, which ensures that the particulate material will not slide down, and the phenomenon of sand leakage is eliminated. When the sand dispensing operation is being carried (Continued)

out, the leakage angle is greater than or equal to the dynamic repose angle of the particulate material, which ensures that the particulate material will slide down along the inclined plane and that the sand is dispensed relatively uniformly.

18 Claims, 4 Drawing Sheets

(51) Int. Cl.
*B22C 5/14* (2006.01)
*B33Y 80/00* (2015.01)

(56) References Cited

U.S. PATENT DOCUMENTS

| | | | |
|---|---|---|---|
| 2018/0011193 A1 | 1/2018 | Brown et al. | |
| 2018/0079133 A1 | 3/2018 | Ederer et al. | |

FOREIGN PATENT DOCUMENTS

| | | |
|---|---|---|
| CN | 206047007 U | 3/2017 |
| CN | 107471634 A | 12/2017 |
| CN | 108127081 A | 6/2018 |
| CN | 109014043 A | 12/2018 |
| CN | 208528014 U | 2/2019 |
| JP | 2008-540100 A | 11/2008 |
| JP | 2009-096572 A | 5/2009 |
| JP | 2009096572 A | 5/2009 |
| JP | 2016120987 A | 7/2016 |
| JP | 2016203248 A | 12/2016 |
| WO | 2017092845 A1 | 6/2017 |
| WO | 2017/177603 A1 | 10/2017 |

OTHER PUBLICATIONS

ISR; China National Intellectual Property Administration; China; dated Jun. 28, 2019.
JP2019-014195; Decision To Grant a Patent; dated Sep. 17, 2020.
JP2019-014195; Notice of Reasons for Refusal; dated Jan. 22, 2020.
European Search Report for EP19151437; the Hague; dated Aug. 2, 2019.
EPO Office Action; dated Nov. 14, 2019.
EPO Office Action; dated Aug. 11, 2020.
EPO Office Action; dated Jan. 11, 2021.
First Office Action of EPO family application19151437.1.
Second Office Action of EPO Family Application 19151437.1.
Third Office Action of EPO Family Application 19151437.1.

* cited by examiner

UNIDIRECTIONAL OR BIDIRECTIONAL SAND DISPENSING DEVICE

CROSS-REFERENCE TO RELATED APPLICATIONS

The present disclosure claims priority of Chinese Patent Application No. 201810812221.7, filed with the Chinese Patent Office on Jul. 23, 2018, entitled "Unidirectional or Bidirectional Sand Dispensing Device", the contents of which are incorporated herein by reference in their entirety.

TECHNICAL FIELD

The present disclosure relates to the field of 3D printers, and in particular to a unidirectional or bidirectional sand dispensing (spreading) device.

BACKGROUND ART

At present, a sand dispensing device used in a sand mold three-dimensional (3D) printing apparatus has a discharge port opened in a straight manner. Although it can be ensured that sand can be discharged and the sand surface is compacted, there is a serious phenomenon of sand leakage during the printing process, which leads to an increase in printing cost and also causes the printed product with a certain defect, and easily causes insufficient supply of sand to a sand mixing device, resulting in delamination or even scrapping of the printed product.

On the other hand, all the current sand dispensing devices discharge sand by using vibration, and such discharge port cannot ensure a uniform level in the aspect of amount of sand that discharged instantaneously, which results in a tremendously difference in, for example, weight and surface of the printed products. If the material dispensing devices can be optimized and improved for the above problems existing in the prior art, the quality problems of products printed using the material dispensing devices in the entire 3D printing field will be readily solved.

SUMMARY

In view of the deficiencies of the prior art, the present disclosure provides a unidirectional or bidirectional sand dispensing device. An object of the present disclosure includes designing a discharge port in a staggered arrangement by using the principle of angle of repose, so that a particulate material is piled up into an inclined plane in a sand discharging passage, and the particulate material slides down when necessary, while the particulate material does not fall down when stop working, the phenomenon of sand leakage is thus eliminated.

The following technical solution is employed in the present disclosure to solve its technical problems:

A unidirectional or bidirectional sand dispensing device comprises a discharge port, wherein the discharge port comprises a lower plate and an upper plate, the upper plate is provided above the lower plate, and an endpoint of a free end of the upper plate is located above the lower plate, an included angle between a horizontal plane and a plane where the endpoint of the free end of the upper plate and an endpoint of a free end of the lower plate are located is a leakage angle, a particulate material forms an inclined plane under barrier effect of the upper plate and the lower plate, the inclined plane is located on the same plane as the plane where the endpoint of the free end of the upper plate and the endpoint of the free end of the lower plate are located, that is to say, an included angle between the inclined plane and the horizontal plane is the leakage angle, which can be adjusted by changing relative positions of the upper plate and the lower plate.

Here, the above wording "the inclined plane is located on the same plane as the plane where the endpoint of the free end of the upper plate and the endpoint of the free end of the lower plate are located" means that a straight line where the endpoint of the free end of the upper plate and the endpoint of the free end of the lower plate are both located is within the above-mentioned inclined plane.

Optionally, when the unidirectional or bidirectional sand dispensing device is in a stationary working condition, the leakage angle is less than or equal to a static repose angle of the particulate material, and is greater than or equal to zero; and when the unidirectional or bidirectional sand dispensing device is in a motion working condition, the leakage angle is greater than or equal to a dynamic repose angle of the particulate material.

At least one discharge port is provided, wherein a sand-passing direction of an opening of a sand passing passage between the upper plate and the lower plate is opposite to a moving direction in a sand dispensing operation.

Optionally, at least two discharge ports are provided, wherein two adjacent discharge ports are arranged in a mirror symmetrical manner; and the two adjacent discharge ports operate alternately.

That is to say, only one discharge port performs the sand discharging operation during movement toward one direction.

Optionally, the unidirectional or bidirectional sand dispensing device further comprises a sand discharging tank, the discharge port is provided at a lower opening of the sand discharging tank, one end of the lower plate is connected to the sand discharging tank, and the opposite end of the lower plate extends downward by a distance and then is bent toward the inside of the sand discharging tank to form a bent section of the lower plate; the upper plate is a flat plate, and one end of the upper plate is connected to the sand discharging tank.

Optionally, the unidirectional or bidirectional sand dispensing device further comprises a sand discharging tank, the discharge port is provided at a lower opening of the sand discharging tank, one end of the lower plate is connected to the sand discharging tank, and the opposite end of the lower plate extends downward by a distance and then is bent toward the inside of the sand discharging tank to form a bent section of the lower plate; one end of the upper plate is fixedly connected to the sand discharging tank, and the opposite end of the upper plate extends downward by a distance and then is bent toward the inside of the sand discharging tank to form a bent section of the upper plate.

Optionally, an included angle between the bent section of the upper plate and the horizontal plane is 0° to 45°.

Optionally, an included angle between the bent section of the lower plate and the horizontal plane is 0° to 45°.

Optionally, the unidirectional or bidirectional sand dispensing device further comprises a sand pressing plate, and each of the discharge ports corresponds to one of the sand pressing plates, or every two adjacent discharge ports correspond to one of the sand pressing plates; the sand pressing plate is horizontally provided on one side of the discharge port, and the sand pressing plate is located below the lower plate, and a chamfer of an end of the sand pressing plate, at one side close to the discharge port, is rounded.

When the sand dispensing operation is being carried out, the sand pressing plate compacts the fallen particulate material in the downstream of the corresponding discharge port.

Optionally, the unidirectional or bidirectional sand dispensing device further comprises a sand storage device, the sand storage device comprises a sand storage bin and a screen, at least one sand discharging tank is provided at a lower portion of the sand storage bin, and the screen is provided at an upper opening of each of the sand discharging tanks, respectively.

Optionally, the sand discharging tank is arranged along a long axis of the unidirectional or bidirectional sand dispensing device, and the sand discharging tank has a horizontal sectional area gradually decreasing from top to bottom.

Optionally, the sand storage device further comprises a splitter plate and a screw propulsion device, the screw propulsion device is provided at a middle portion of the sand storage bin, the splitter plate is provided at a middle portion of a lower opening of the sand storage bin, and both sides of the splitter plate are provided with corresponding sand discharging tanks, respectively.

Optionally, the splitter plate is a lambdoidal splitter plate extending along a long axis of the unidirectional or bidirectional sand dispensing device.

Optionally, the unidirectional or bidirectional sand dispensing device further comprises a vibration device, a main beam, a side beam, and a flexible sealing strip. The sand storage bin is provided on the main beam, the side beam is provided below the main beam, and the side beam is provided with the vibration device and the sand discharging tank, the upper opening of the sand discharging tank is provided below the lower opening of the sand storage bin, and a gap between the sand discharging tank and the sand storage bin is closed by the flexible sealing strip to form a closed sand passing passage; the vibration device is mounted on one side of the sand discharging tank, and the vibration device is configured to drive the sand discharging tank to vibrate along both upward-downward and forward-backward directions.

Here, the gap between the sand discharging tank and the sand storage bin is closed by the flexible sealing strip, that is to say, one end of the flexible sealing strip is sealingly and fixedly connected to the lower opening of the sand storage bin, with the other end sealingly and fixedly connected to the upper opening of the sand discharging tank.

Optionally, the unidirectional or bidirectional sand dispensing device further comprises a mounting plate and a pin, the mounting plate is fixedly connected to the sand discharging tank, one end of the lower plate is hinged to the mounting plate, an angle scale is provided on the mounting plate, and a plurality of holes for pin positioning are provided in the mounting plate, and both sides of one end of the lower plate are fastened to the mounting plate by the pin.

Optionally, two discharge ports are provided, one end of one of the lower plates is combined with one end of the other one of the lower plates to form a splayed shape, and a spring is provided between the one end of one of the lower plates and the one end of the other one of the lower plates, and the spring is configured such that the degree of the leakage angle remains unchanged when the unidirectional or bidirectional sand dispensing device is in a motion working condition.

As can be seen from the technical solutions described above, in the unidirectional or bidirectional sand dispensing device provided in the present disclosure, a discharge port in a staggered arrangement is designed by using the principle of angle of repose, so that a particulate material is piled up with an inclined plane in the sand discharging passage, an included angle between the inclined plane and the horizontal plane is a leakage angle, and the direction of an opening of the sand passing passage is opposite to a moving direction during the sand dispensing operation. In other words, when the sand dispensing operation is stopped, the leakage angle is less than or equal to the static repose angle of the particulate material, and is greater than or equal to zero, which ensures that the particulate material will not slide down, and the phenomenon of sand leakage is eliminated. When the sand dispensing operation is being carried out, the leakage angle is greater than or equal to the dynamic repose angle of the particulate material, which ensures that the particulate material will slide down along the inclined plane. Moreover, in the present disclosure, the sand is dispensed relatively uniformly, without suddenly discharging a large amount of the material.

In the figures: 10—discharge port; 11—lower plate; 12—upper plate; 13—leakage angle; 20—sand pressing plate; 30—sand storage device; 31—sand storage bin; 32—sand discharging tank; 33—screen; 34—splitter plate; 35—screw propulsion device; 40—vibration device; 50—main beam; 60—side beam; 70—flexible sealing strip; 80—mounting plate; 81—hole for pin positioning; 90—pin; 100—spring.

DETAILED DESCRIPTION OF EMBODIMENTS

The technical solutions of embodiments of the present disclosure will be described in further detail with reference to the drawings of the present disclosure.

A slope of a material pile when a particulate material is naturally piled up, i.e., an included angle between the steepest plane of the material pile and a horizontal plane, is referred to as an angle of repose, wherein an angle of repose in a static state is referred to as a static repose angle, and an angle of repose of a particulate material on a sand dispensing device in a dynamic state, for example when the sand dispensing device starts to move, is referred to as a dynamic repose angle. In general, a degree of the dynamic repose angle is 70% of that of the static repose angle.

The present embodiment provides a unidirectional or bidirectional sand dispensing device. Referring to FIG. 4 in combination with FIG. 1 to FIG. 3, the unidirectional or bidirectional sand dispensing device comprises a discharge port 10, the discharge port 10 comprises a lower plate 11 and an upper plate 12, the upper plate 12 is provided above the lower plate 11, an included angle between a horizontal plane and a straight line where an endpoint of a free end of the upper plate 12 and an endpoint of a free end of the lower plate 11 are located is a leakage angle 13, a particulate material is piled up between the upper plate 12 and the lower plate 11, wherein the particulate material forms an inclined plane under barrier effect of the upper plate 12 and the lower plate 11, the inclined plane is located on the same plane as a plane where the endpoint of the free end of the upper plate 12 and the endpoint of the free end of the lower plate 11 are located, that is to say, an included angle between the inclined plane and the horizontal plane is the leakage angle 13, which can be adjusted by changing relative positions of the upper plate 12 and the lower plate 11.

Here, the above wording "the inclined plane is located on the same plane as a plane where the endpoint of the free end of the upper plate 12 and the endpoint of the free end of the lower plate 11 are located" means that the straight line where the endpoint of the free end of the upper plate 12 and the endpoint of the free end of the lower plate 11 are located is in the above-mentioned inclined plane.

Optionally, referring to FIG. 4, when the unidirectional or bidirectional sand dispensing device is in a stationary working condition, the leakage angle 13 is less than or equal to a static repose angle of the particulate material, and is greater than or equal to zero; and when the unidirectional or bidirectional sand dispensing device is in a motion working condition, the leakage angle 13 is greater than or equal to a dynamic repose angle of the particulate material. The angle of repose is a physical property of a particulate material, and different particulate materials generally have different angles of repose, therefore the degree of the leakage angle 13 should be adjusted depending on different particulate materials. There are many ways to change the relative positions of the upper plate 12 and the lower plate 11 to adjust the degree of the leakage angle 13. For example, the upper plate 12 and the lower plate 11 may be adjusted upward, downward, leftward, or rightward simultaneously or separately to change the degree of the leakage angle 13 to ensure the satisfaction of requirements for angles of repose of different particulate materials. Specifically, the adjustment of the upper plate 12 or the lower plate 11 may be implemented by means of upward and downward sliding, rotation motion, linear driving, mechanical limit, etc., that is to say, the adjustment of the leakage angle 13, which is an included angle between the horizontal plane and the straight line where the endpoint of the free end of the upper plate 12 and the endpoint of the free end of the lower plate 11 are located, is implemented by such as mounting a driving device, a rotating mechanism and mounting a structure for mechanical hard limit, and by means of setting a driving limit and a stroke in a program, adding a mechanical hard limit, etc., so as to accomplish the purpose of no leakage of sand from the sand dispenser.

Optionally, at least one discharge port 10 is provided, reference may be made to FIG. 4 for the specific structure of each discharge port 10, and a direction of an opening of a sand passing passage between the upper plate 12 and the lower plate 11 is opposite to a moving direction in a sand dispensing operation. In the case where two discharge ports 10 are provided, the two discharge ports operate alternately, that is to say, only one discharge port performs the sand discharging operation during movement toward one direction.

The setting of the above-mentioned directions is very important, because only a structure in which the above-mentioned directions are set oppositely can allow absolutely no leakage of the particulate material due to a transition from a dynamic repose angle to a static repose angle when the sand dispensing device is in a stationary working condition, while allow uniform leakage of sand to be started rapidly without delay due to a transition from the static repose angle to the dynamic repose angle when the sand dispensing device is activated. Only in this way, the leakage of sand can be eliminated, especially at the time of transition between the static and dynamic states.

Optionally, on the basis of the embodiments described above, at least two discharge ports 10 are further provided, and two adjacent discharge ports 10 are arranged in a mirror symmetrical manner; and the two adjacent discharge ports 10 operate alternately, that is to say, only one discharge port 10 performs the sand discharging operation during movement toward one direction. For example, referring to FIG. 2 to FIG. 4, two discharge ports 10 are provided in a mirror symmetrical manner so as to achieve bidirectional dispensing of sand, and the two discharge ports 10 operate alternately, that is to say, only one discharge port 10 performs the sand discharging operation during movement toward one direction.

Figure 2:
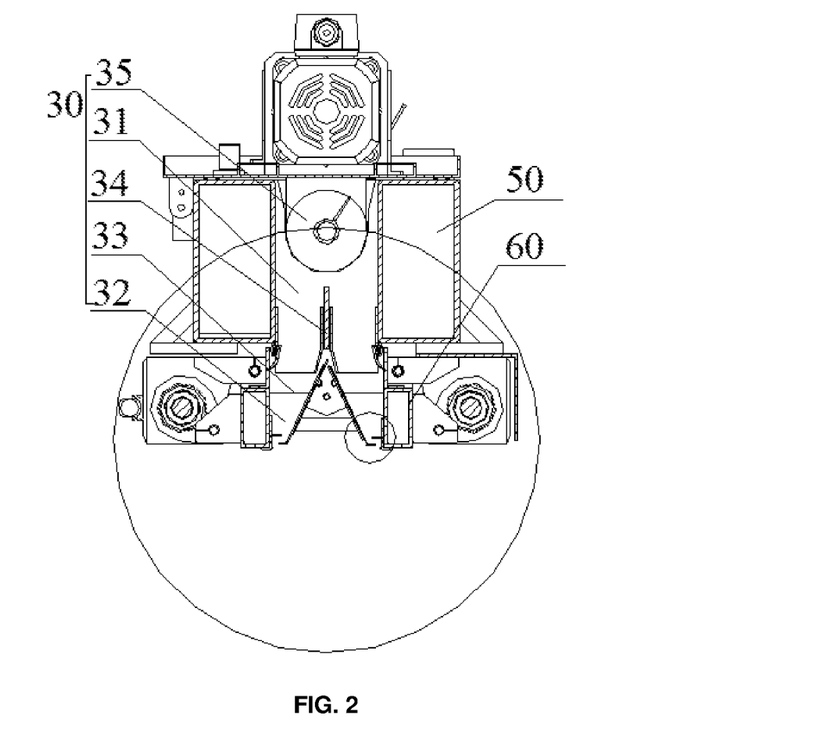
FIG. 2 is a sectional view of a unidirectional or bidirectional sand dispensing device.
Figure 3:
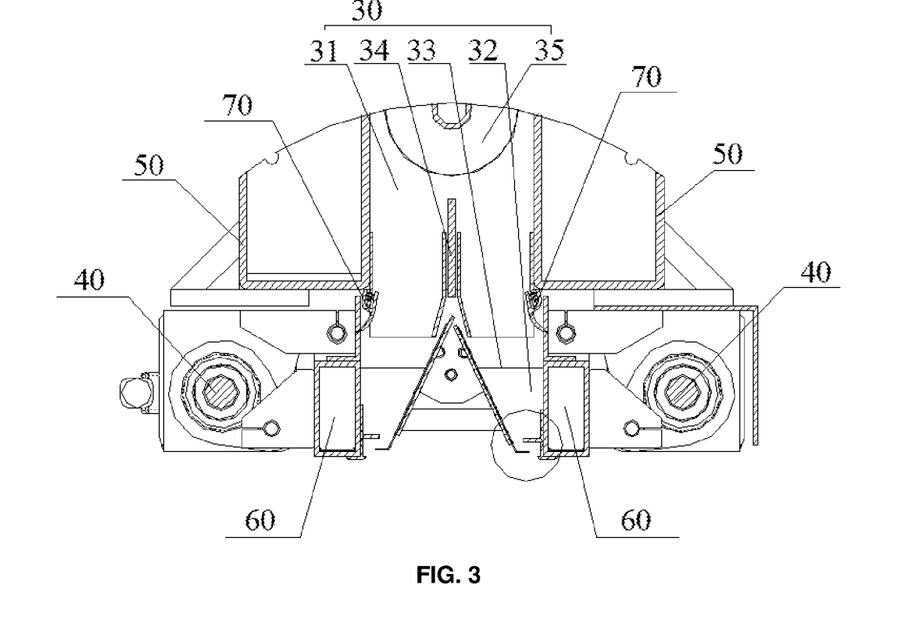
FIG. 3 is a partial enlarged view of FIG. 2.
Figure 4:
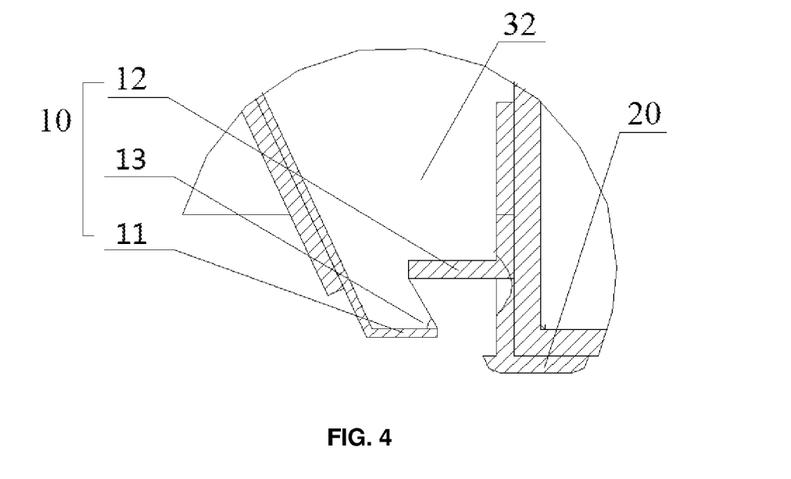
FIG. 4 is a partial enlarged view of FIG. 3.
Figure 7:
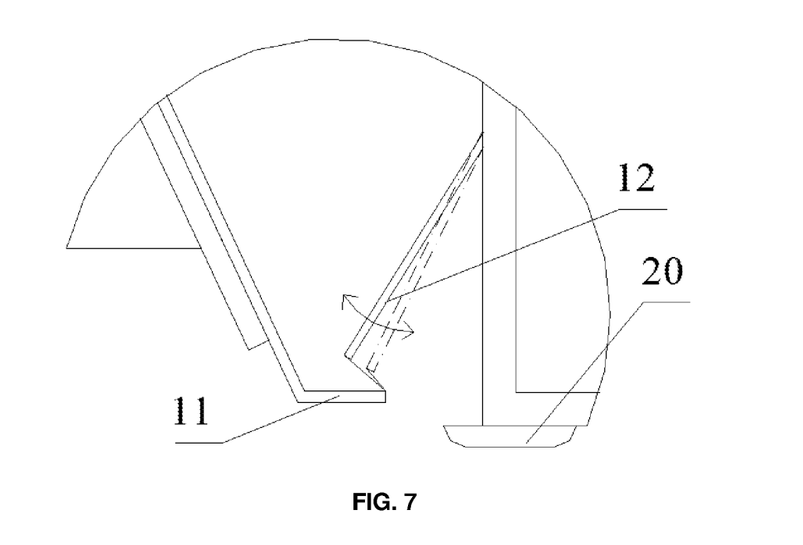
FIG. 7 is a schematic view showing a structure of a third discharge port of a unidirectional or bidirectional sand dispensing device.

Optionally, referring to FIG. 2 and FIG. 3, on the basis of the embodiments described above, the unidirectional or bidirectional sand dispensing device further comprises a sand discharging tank 32, and the discharge port 10 is provided at a lower opening of the corresponding sand discharging tank 32. Specifically, referring to FIG. 7, the discharge port 10 is specifically configured such that one end of the lower plate 11 is fixedly connected or hinged or slidably connected to the sand discharging tank 32, and the opposite end of the lower plate 11 extends downward by a distance and then is bent toward the inside of the sand discharging tank to form a bent section of the lower plate 11; preferably, the lower plate 11 is bent toward the inside of the sand discharging tank, and an included angle between the bent section of the lower plate 11 and the horizontal plane is 0° to 45°; for example, the included angle between the bent section of the lower plate 11 and the horizontal plane is, but not limited to, 0° or 15° or 25° or 30° or 45°. The upper plate 12 is a flat plate, and one end of the upper plate 12 is fixedly connected or hinged or slidably connected to the sand discharging tank 32, and the endpoint of the free end of the upper plate 12 is located above the lower plate 11.

Figure 5:
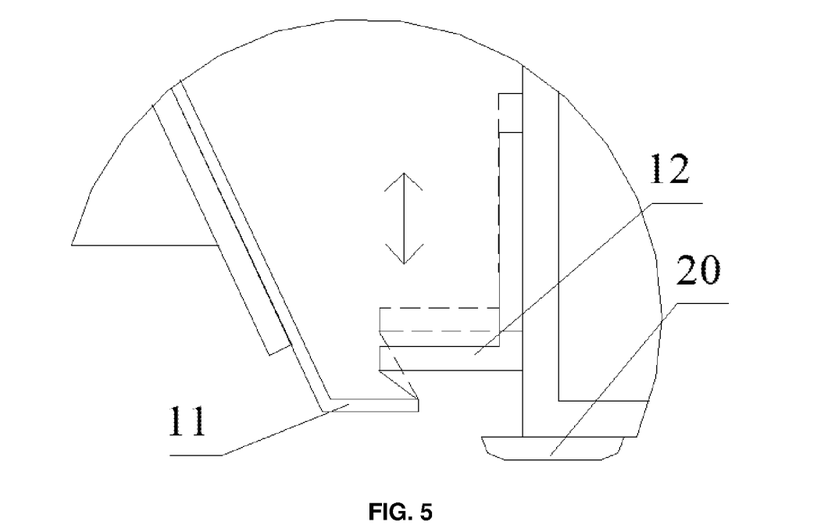
FIG. 5 is a schematic view showing a structure of a first discharge port of a unidirectional or bidirectional sand dispensing device.
Figure 6:
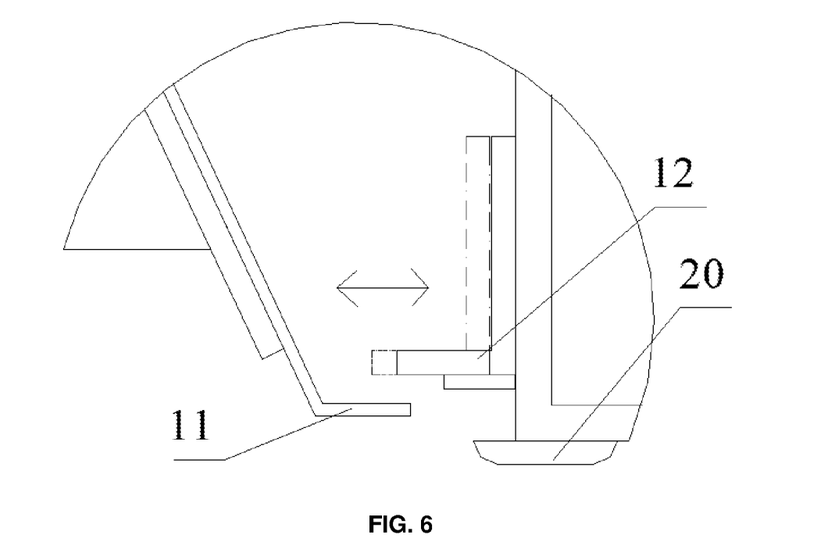
FIG. 6 is a schematic view showing a structure of a second discharge port of a unidirectional or bidirectional sand dispensing device.

Optionally, referring to FIG. 2 and FIG. 3, on the basis of the embodiments described above, the unidirectional or bidirectional sand dispensing device further comprises a sand discharging tank 32, and the discharge port 10 is provided at a lower opening of the corresponding sand discharging tank 32. Specifically, referring to FIG. 5 and FIG. 6, the discharge port 10 is specifically configured such that one end of the lower plate 11 is fixedly connected or hinged or slidably connected to the sand discharging tank 32, and the opposite end of the lower plate 11 extends downward by a distance and then is bent toward the inside of the sand discharging tank to form a bent section of the lower plate 11, and preferably, an included angle between the bent section of the lower plate 11 and the horizontal plane is 0° to 45°; for example, the included angle between the bent section of the lower plate 11 and the horizontal plane is, but not limited to, 0° or 15° or 25° or 30° or 45°. One end of the upper plate 12 is fixedly connected to the sand discharging tank 32, and the opposite end of the upper plate 12 extends downward by a distance and then is bent toward the inside of the sand discharging tank to form a bent section of the upper plate 12, preferably, an included angle between the bent section of the upper plate 12 and the horizontal plane is 0° to 45°, and for example, the included angle between the bent section of the upper plate 12 and the horizontal plane is, but not limited to, 0° or 15° or 25° or 30° or 45°; and the upper plate 12 is fixedly connected or hinged or slidably connected to the sand discharging tank 32.

Optionally, referring to FIG. 2 to FIG. 7, on the basis of the embodiments described above, the unidirectional or bidirectional sand dispensing device further comprises a sand pressing plate 20, the sand pressing plates 20 is provided with a one-to-one correspondence with the discharge ports 10, that is to say, each discharge port 10 corresponds to one sand pressing plate 20, or every two adjacent discharge ports 10 correspond to one sand pressing plate 20, the sand pressing plate 20 is horizontally provided on one side of the discharge port 10, and the sand pressing plate 20 is located below the lower plate 11, a chamfer of an end of the sand pressing plate 20, at one side close to the discharge port 10, is rounded, and when the sand dispensing operation is being carried out, the sand pressing plate 20 compacts the fallen particulate material in the downstream of the corresponding discharge port 10.

Here, the chamfer of the end is designed as a rounded angle instead of a right angle so as to avoid the problem caused by the right-angled chamfer that the sand is pushed severely and the process is affected, thereby accomplishing a good sand pressing effect.

Figure 1:
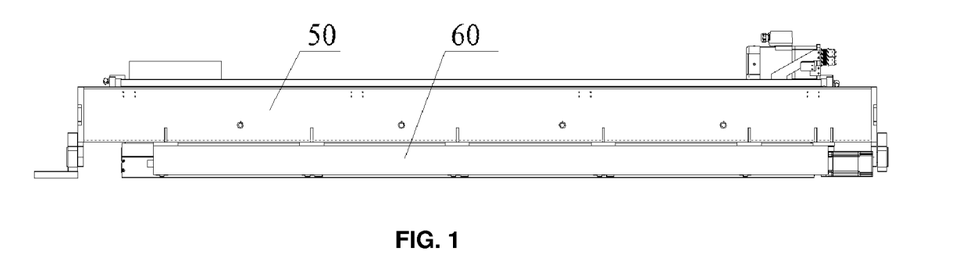
FIG. 1 is a schematic view showing an overall structure of a unidirectional or bidirectional sand dispensing device.

Optionally, referring to FIG. 1 to FIG. 3, on the basis of the embodiments described above, the unidirectional or bidirectional sand dispensing device further comprises a sand storage device 30, and the sand storage device 30 comprises a sand storage bin 31, a sand discharging tank 32, a screen 33, a splitter plate 34, and a screw propulsion device 35.

The screw propulsion device 35 is provided at a middle portion of the sand storage bin 31, the splitter plate 34 is provided at a middle portion of a lower opening of the sand storage bin 31, both sides of the splitter plate 34 are provided with corresponding sand discharging tanks 32, respectively, that is to say, two sand discharging tanks 32 are provided at a lower portion of the sand storage bin 31, the discharge port 10 is provided at a lower portion of the sand discharging tank 32, and the screen 33 is provided at an upper opening of the sand discharging tank 32. The sand discharging tank 32 is arranged along a long axis of the sand dispensing device, and has a horizontal sectional area gradually decreasing from top to bottom, that is to say, it is tapered, which facilitates discharging of sand.

Optionally, referring to FIG. 2 and FIG. 3, the splitter plate is a lambdoidal splitter plate extending along the long axis of the unidirectional or bidirectional sand dispensing device.

Optionally, referring to FIG. 2 and FIG. 3, the unidirectional or bidirectional sand dispensing device further comprises a vibration device 40, a main beam 50, a side beam 60, and a flexible sealing strip 70.

The sand storage bin 31 is provided on the main beam 50, the side beam 60 is provided below the main beam 50, and the side beam 60 is provided with the vibration device 40 and the sand discharging tank 32, the upper opening of the sand discharging tank 32 is provided below the lower opening of the sand storage bin 31, and a gap between the sand discharging tank 32 and the sand storage bin 31 is closed by the flexible sealing strip 70, that is to say, one end of the flexible sealing strip 70 is sealingly and fixedly connected to the lower opening of the sand storage bin 31, with the other end sealingly and fixedly connected to the upper opening of the sand discharging tank 32 to form a closed sand passing passage; the vibration device 40 is mounted on one side of the sand discharging tank 32, and the vibration device 40 is configured to drive the sand discharging tank 32 to vibrate along both upward-downward and forward-backward directions.

The vibration device 40 enables the sand discharged much faster and more uniformly, and when in combination with the sand pressing plate 20, enables the sand pressing plate 20 a more remarkable effect, and the forward-backward and upward-downward vibrations allow the sand pressing plate 20 to compact the particulate material to achieve the compaction of the sand surface and ensure the quality of the printed product.

The sand storage bin 31 and the sand discharging tank 32 are separately fixed, the vibration device 40 vibrates only the sand discharging tank 32, and the flexible sealing strip 70, on one hand, ensures the sealing of the passage, and on the other hand, acts as a buffer so that the vibration is not transferred from the sand discharging tank 32 to the sand storage bin 31, because the particulate material in the sand storage bin will be more compacted and will not be easily discharged if the sand storage bin 31 is vibrated frequently.

The screen 33 is provided because the sand in the sand storage bin 31 sometimes has a problem of agglomeration (caking), and if it reaches the discharge port 10, the discharge of sand is blocked and a fault is formed, which affects the sand core structure. On one hand, the screen 33 is provided to solve the problem of blocking of the discharge port 10 by a large agglomeration of particulate material, while shattering the large agglomeration of particulate material on the screen 33 by means of the vibration device 40, and on the other hand, the screen 33 is provided to achieve the purpose of flow restricting and uniform mixing, whereby after the particulate material falls from the sand storage bin 31, the screen 33 blocks the falling particulate material within a short time, and the particulate material is mixed uniformly by means of the vibration device 40, so that the particulate material in the sand discharging tank 32 is more uniform.

Figure 8:
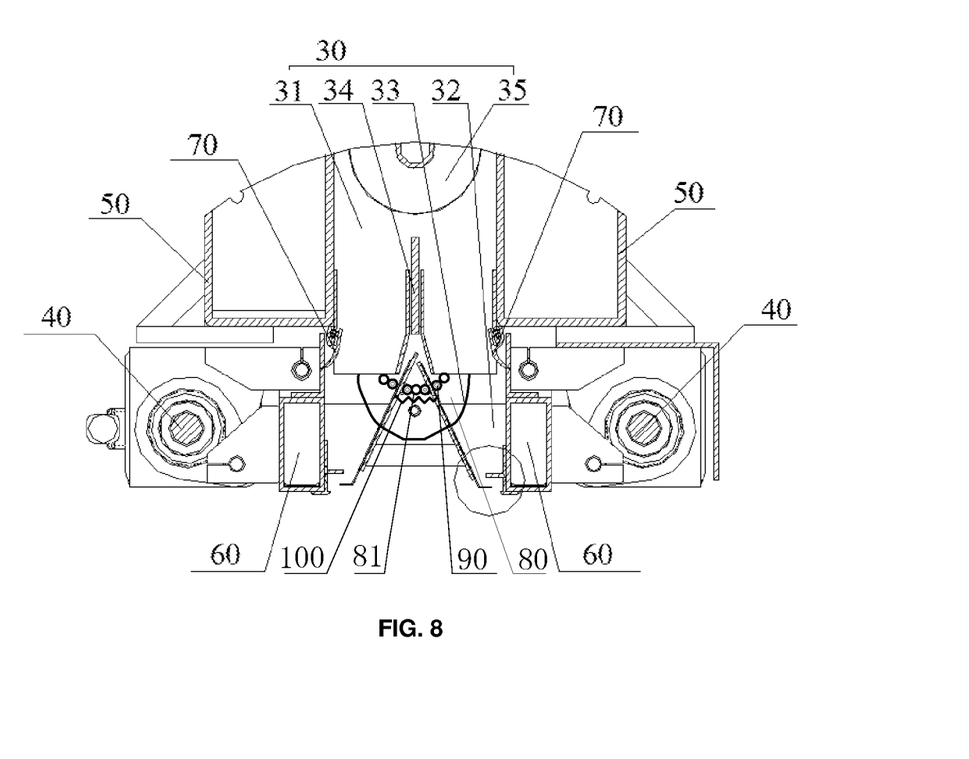
FIG. 8 is a schematic view showing a structure mounted with a lower plate of a discharge port of a unidirectional or bidirectional sand dispensing device.

Optionally, referring to FIG. 8, the unidirectional or bidirectional sand dispensing device further comprises a mounting plate 80 and a pin 90, the mounting plate 80 is fixedly connected to the sand discharging tank 32, one end of the lower plate 11 is hinged to the mounting plate 80, an angle scale is provided on the mounting plate 80, and a plurality of holes 81 for pin positioning are provided in the mounting plate 80, and both sides of one end of the lower plate 11 are fastened to the mounting plate 80 by the pin 90.

Thus, an angle of rotation of the lower plate may be adjusted and controlled by the angle scale, and the adjustment process is convenient and precise.

Optionally, referring to FIG. 8, two discharge ports 10 are provided, one end of one lower plate 11 is combined with one end of the other lower plate 11 to form a splayed shape, and a spring 100 is provided between the one end of one lower plate 11 and the one end of the other lower plate 11, and the spring 100 is configured such that the degree of the leakage angle 13 is unchanged when the unidirectional or bidirectional sand dispensing device is in a motion working condition.

In addition, as shown in FIG. 3, in the present embodiment, two sets of vibration devices 40 may be provided and are provided on two sides of the sand discharging tank, respectively, and are fixedly connected to the side beams 60, so that the vibration is more uniform. In addition, the sand pressing plate 20 may be fixedly connected to the upper plate 12 to form an integrated structure, and one end of the sand pressing plate 20 facing the lower plate 11 is provided to protrude from a vertical end surface of the side beam 60 toward the lower plate 11. In addition, a reinforcing rib is provided between the main beam 50 and the side beam 60; one end of the flexible sealing strip 70 is sealingly and fixedly connected to the lower opening of the sand storage bin 31, with the other end sealingly and fixedly connected to the upper opening of the sand discharging tank 32, and then forming an arched shape.

In the unidirectional or bidirectional sand dispensing device provided in the present disclosure, a discharge port 10 in a staggered arrangement is designed by using the principle of angle of repose, so that a particulate material is piled up with an inclined plane in the sand discharging passage, and an included angle between the inclined plane and the horizontal plane is a leakage angle 13. The direction of an opening of the sand passing passage is opposite to a moving direction during the sand dispensing operation. When the sand dispensing operation is stopped, the leakage angle 13 is less than or equal to the static repose angle of the particulate material, and is greater than or equal to zero, which ensures that the particulate material will not slide down, and the phenomenon of sand leakage is eliminated. When the sand dispensing operation is being carried out, the leakage angle 13 is greater than or equal to the dynamic repose angle of the particulate material, which ensures that the particulate material will slide down along the inclined plane. Moreover, in the present disclosure, the sand is dispensed relatively uniformly, without suddenly discharging a large amount of the material.

INDUSTRIAL APPLICABILITY

A unidirectional or bidirectional sand dispensing device provided in the embodiments of the present disclosure comprises a discharge port, wherein the discharge port comprises a lower plate and an upper plate, the upper plate is provided above the lower plate, an included angle between a horizontal plane and a straight line where an endpoint of a free end of the upper plate and an endpoint of a free end of the lower plate are located is a leakage angle, that is to say, a particulate material forms an inclined plane between the upper plate and the lower plate, an included angle between the inclined plane and the horizontal plane is the leakage angle, which can be adjusted by changing relative positions of the upper plate and the lower plate. The direction of an opening of the sand passing passage is opposite to a moving direction during the sand dispensing operation. When the sand dispensing operation is stopped, the leakage angle is less than or equal to the static repose angle of the particulate material, and is greater than or equal to zero, which ensures that the particulate material will not slide down, and the phenomenon of sand leakage is eliminated. When the sand dispensing operation is being carried out, the leakage angle is greater than or equal to the dynamic repose angle of the particulate material, which ensures that the particulate material will slide down along the inclined plane. Moreover, in the present disclosure, the sand is dispensed relatively uniformly, and therefore the present disclosure is industrially applicable.

The invention claimed is:

1. A unidirectional or bidirectional sand dispensing device, comprising at least one discharge port, wherein each of the at least one discharge port comprises a lower plate and an upper plate, the upper plate is provided above the lower plate, and an endpoint of a free end of the upper plate is located above the lower plate, an included angle between a horizontal plane and a plane where the endpoint of the free end of the upper plate and an endpoint of a free end of the lower plate are located is a leakage angle, particulate materials form an inclined plane under barrier effect of the upper plate and the lower plate, the inclined plane is located on a same plane as the plane where the endpoint of the free end of the upper plate and the endpoint of the free end of the lower plate are located, an included angle between the inclined plane and the horizontal plane is the leakage angle, which is adjustable by changing relative positions between the upper plate and the lower plate, wherein the unidirectional or bidirectional sand dispensing device further comprises a sand storage device, the sand storage device comprises a sand storage bin and a screen, at least one of sand discharging tanks is provided at a lower portion of the sand storage bin, and the screen is provided at an upper opening of each of the at least one of sand discharging tanks, respectively, wherein the unidirectional or bidirectional sand dispensing device further comprises a vibration device, a main beam, a side beam, and a flexible sealing strip; and the sand storage bin is provided on the main beam, the side beam is provided below the main beam, and the side beam is provided with the vibration device and the sand discharging tank, the upper opening of the sand discharging tank is provided below the lower opening of the sand storage bin, and a gap between the sand discharging tank and the sand storage bin is closed by the flexible sealing strip, forming a closed sand passing passage; the vibration device is mounted on one side of the sand discharging tank, and the vibration device is configured to drive the sand discharging tank to vibrate along both upward-downward and forward-backward directions.

2. The unidirectional or bidirectional sand dispensing device according to claim 1, wherein when the unidirectional or bidirectional sand dispensing device is in a stationary working condition, the leakage angle is less than or equal to a static repose angle of the particulate material, and is greater than or equal to zero; and when the unidirectional or bidirectional sand dispensing device is in a motion working condition, the leakage angle is greater than or equal to a dynamic repose angle of the particulate materials; and a sand-passing direction of an opening of a sand passing passage between the upper plate and the lower plate is opposite to a moving direction in a sand dispensing operation.

3. The unidirectional or bidirectional sand dispensing device according to claim 2, wherein at least two discharge ports are provided, wherein two adjacent discharge ports are arranged in a mirror symmetrical manner; and the two adjacent discharge ports operate alternately.

4. The unidirectional or bidirectional sand dispensing device according to claim 2, wherein the unidirectional or bidirectional sand dispensing device further comprises a sand discharging tank, wherein the discharge port is provided at a lower opening of the sand discharging tank, one end of the lower plate is connected to the sand discharging tank, and an opposite end of the lower plate extends downward by a distance and then is bent toward inside of the sand discharging tank to form a bent section of the lower plate; and the upper plate is a flat plate, and one end of the upper plate is connected to the sand discharging tank.

5. The unidirectional or bidirectional sand dispensing device according to claim 2, wherein the unidirectional or bidirectional sand dispensing device further comprises a sand discharging tank, wherein the discharge port is provided at a lower opening of the sand discharging tank, one end of the lower plate is connected to the sand discharging tank, and the opposite end of the lower plate extends downward by a distance and then is bent toward inside of the sand discharging tank to form a bent section of the lower plate; and     one end of the upper plate is fixedly connected to the sand discharging tank, and an opposite end of the upper plate extends downward by a distance and then is bent toward the inside of the sand discharging tank to form a bent section of the upper plate.

6. The unidirectional or bidirectional sand dispensing device according to claim 1, wherein at least two discharge ports are provided, wherein two adjacent discharge ports are arranged in a mirror symmetrical manner; and the two adjacent discharge ports operate alternately.

7. The unidirectional or bidirectional sand dispensing device according to claim 6, wherein the unidirectional or bidirectional sand dispensing device further comprises a sand discharging tank, wherein the discharge port is provided at a lower opening of the sand discharging tank, one end of the lower plate is connected to the sand discharging tank, and an opposite end of the lower plate extends downward by a distance and then is bent toward inside of the sand discharging tank to form a bent section of the lower plate; and     the upper plate is a flat plate, and one end of the upper plate is connected to the sand discharging tank.

8. The unidirectional or bidirectional sand dispensing device according to claim 6, wherein the unidirectional or bidirectional sand dispensing device further comprises a sand discharging tank, wherein the discharge port is provided at a lower opening of the sand discharging tank, one end of the lower plate is connected to the sand discharging tank, and the opposite end of the lower plate extends downward by a distance and then is bent toward inside of the sand discharging tank to form a bent section of the lower plate; and     one end of the upper plate is fixedly connected to the sand discharging tank, and an opposite end of the upper plate extends downward by a distance and then is bent toward the inside of the sand discharging tank to form a bent section of the upper plate.

9. The unidirectional or bidirectional sand dispensing device according to claim 1, wherein the unidirectional or bidirectional sand dispensing device further comprises a sand discharging tank, wherein the discharge port is provided at a lower opening of the sand discharging tank, one end of the lower plate is connected to the sand discharging tank, and an opposite end of the lower plate extends downward by a distance and then is bent toward inside of the sand discharging tank to form a bent section of the lower plate; and     the upper plate is a flat plate, and one end of the upper plate is connected to the sand discharging tank.

10. The unidirectional or bidirectional sand dispensing device according to claim 9, wherein an included angle between the bent section of the lower plate and the horizontal plane is 0° to 45°.

11. The unidirectional or bidirectional sand dispensing device according to claim 1, wherein the unidirectional or bidirectional sand dispensing device further comprises a sand discharging tank, wherein the discharge port is provided at a lower opening of the sand discharging tank, one end of the lower plate is connected to the sand discharging tank, and the opposite end of the lower plate extends downward by a distance and then is bent toward inside of the sand discharging tank to form a bent section of the lower plate; and     one end of the upper plate is fixedly connected to the sand discharging tank, and an opposite end of the upper plate extends downward by a distance and then is bent toward the inside of the sand discharging tank to form a bent section of the upper plate.

12. The unidirectional or bidirectional sand dispensing device according to claim 11, wherein an included angle between the bent section of the upper plate and the horizontal plane is 0° to 45°.

13. The unidirectional or bidirectional sand dispensing device according to claim 11, wherein the sand discharging tank is arranged along a long axis of the unidirectional or bidirectional sand dispensing device, and the sand discharging tank has a horizontal sectional area gradually decreasing from top to bottom.

14. The unidirectional or bidirectional sand dispensing device according to claim 11, wherein the unidirectional or bidirectional sand dispensing device further comprises a mounting plate and pins; and     the mounting plate is fixedly connected to the sand discharging tank, one end of the lower plate is hinged to the mounting plate, angle scales are provided on the mounting plate, and a plurality of holes 81 for pin positioning are provided in the mounting plate, and both sides of one end of the lower plate are fastened to the mounting plate by the pins.

15. The unidirectional or bidirectional sand dispensing device according to claim 14, wherein the discharge ports are provided in the number of two, one end of lower plate of one of the discharge ports is combined with one end of lower plate of the other one of the discharge ports to form a splayed shape, and a spring is provided between the one end of one lower plate and the one end of the other lower plate, and the spring is configured such that the degree of the leakage angle is unchanged when the unidirectional or bidirectional sand dispensing device is in a motion working condition.

16. The unidirectional or bidirectional sand dispensing device according to claim 1, wherein the unidirectional or bidirectional sand dispensing device further comprises sand pressing plates, and each of the discharge ports corresponds to one of the sand pressing plates, or every two adjacent discharge ports correspond to one of the sand pressing plates; and     each of the sand pressing plates is horizontally provided on one side of the discharge port, and the sand pressing plate is located below the lower plate, and a chamfer of an end of the sand pressing plate, at one side close to the discharge port, is rounded.

17. The unidirectional or bidirectional sand dispensing device according to claim 1, wherein the sand storage device further comprises a splitter plate and a screw propulsion device; and the screw propulsion device is provided at a middle portion of the sand storage bin, the splitter plate is provided at a middle portion of a lower opening of the sand storage bin, and both sides of the splitter plate are provided with corresponding sand discharging tanks, respectively.

18. The unidirectional or bidirectional sand dispensing device according to claim 17, wherein the splitter plate is a lambdoidal splitter plate extending along a long axis of the unidirectional or bidirectional sand dispensing device.

\* \* \* \* \*